(12) United States Patent
Landers

(10) Patent No.: US 6,640,506 B2
(45) Date of Patent: Nov. 4, 2003

(54) BIRD DETERRENT APPARATUS

(76) Inventor: Phillip G. Landers, 5312 Vista Club Run, Sanford, FL (US) 32771

( * ) Notice: Subject to any disclaimer, the term of this patent is extended or adjusted under 35 U.S.C. 154(b) by 0 days.

(21) Appl. No.: 10/113,024

(22) Filed: Apr. 1, 2002

(65) Prior Publication Data

US 2003/0182876 A1 Oct. 2, 2003

(51) Int. Cl.[7] .......................... A01M 29/00; E04B 1/72
(52) U.S. Cl. ............................................... 52/101; 43/1
(58) Field of Search .................. 52/101; 43/1; 119/713, 119/903; 256/11

(56) References Cited

U.S. PATENT DOCUMENTS

| | | |
|---|---|---|
| 3,282,000 A | 11/1966 | Shaw et al. |
| 3,292,319 A | 12/1966 | McCarthy |
| 3,407,550 A | 10/1968 | Shaw |
| 4,074,653 A | 2/1978 | Pember |
| 4,143,437 A | 3/1979 | Voykin |
| 4,262,169 A | 4/1981 | Lanton, Jr. |
| 4,359,844 A | 11/1982 | Hoggard et al. |
| 4,748,778 A * | 6/1988 | Rafter, Sr. .................. 52/101 |
| 4,937,988 A | 7/1990 | Gratton |
| 4,962,619 A | 10/1990 | Chatten |
| 5,058,335 A | 10/1991 | Richter |
| 5,092,088 A | 3/1992 | Way |
| 5,167,099 A | 12/1992 | Nelson |
| 5,181,338 A | 1/1993 | Chatten |
| 5,253,444 A | 10/1993 | Donoho et al. |
| 5,299,528 A | 4/1994 | Blankenship |
| 5,343,651 A | 9/1994 | Chatten |
| 5,400,552 A | 3/1995 | Negre |
| 5,433,029 A | 7/1995 | Donoho et al. |
| 5,452,536 A | 9/1995 | Chatten |
| 5,454,183 A | 10/1995 | Antonini et al. |
| 5,497,585 A | 3/1996 | Engler |
| 5,606,830 A | 3/1997 | Townsend, Jr. et al. |
| 5,615,524 A | 4/1997 | Costa, Sr. |
| 5,648,641 A * | 7/1997 | Guthrie ....................... 174/139 |
| 5,649,394 A * | 7/1997 | Ohba .......................... 52/101 |
| 5,691,032 A | 11/1997 | Trueblood et al. |
| 5,713,160 A | 2/1998 | Heron |
| 5,765,319 A | 6/1998 | Callaghan, Jr. |
| 5,974,998 A * | 11/1999 | Gregg, III ..................... 114/90 |
| 6,250,023 B1 | 6/2001 | Donoho |
| 6,264,173 B1 * | 7/2001 | Badger et al. ................. 256/10 |
| 6,534,719 B2 * | 3/2003 | Wright ........................ 174/139 |

FOREIGN PATENT DOCUMENTS

| | | | | |
|---|---|---|---|---|
| GB | 2250172 A | * | 6/1992 | .......... A01M/29/00 |
| JP | 0186903 | * | 1/2000 | .......... A01M/29/00 |

* cited by examiner

Primary Examiner—Brian E. Glessner
(74) Attorney, Agent, or Firm—William M. Hobby, III

(57) ABSTRACT

A bird deterrent apparatus has a base for attaching to a surface and a post attached thereto and extending therefrom in a generally vertical direction when attached to a top of a pole. A plurality of moveable fingers are attached to the post and each of the attached fingers extend at a downward angle and away from the post so that a bird landing on one of the plurality of movable fingers will cause the movable fingers to move and prevent the bird from perching thereon. A plurality of fingers are spaced around the post and may be flexible metal members, or alternatively, may be a plurality of rigid rods each forming a pair of fingers by the rod extending through a bore in the post and being bent downward on each side of the post so that a pair of fingers are attached and swing in seesaw fashion so that a bird landing on the one finger of a pair will move it downward while moving the opposite attached finger upward.

10 Claims, 3 Drawing Sheets

BIRD DETERRENT APPARATUS

BACKGROUND OF THE INVENTION

The present invention relates to a device for preventing birds from roosting on structures, such as buildings, telephone poles, boat masts and the like.

Roosting of birds on static outdoor structures (e.g. buildings, buoys, telephone poles) and on moveable structures (e.g. boats especially sail boat masts) has been a problem for many years. The droppings of roosting birds physically and visually damage the structures and objects underlying the structures. Over the years, many different types of devices have been suggested for preventing birds from roosting on various types of outdoor structures, e.g. buildings, buoys, etc. Such devices are designed to protect the structure and objects underlying the structure from damage from the droppings of birds that would otherwise roost on the structure. One type of device for preventing birds from roosting on a static structure, such as a building, includes sheet metal or wire bent or formed into predetermined shapes and attached to the structure to physically deter birds from gaining a foothold on the structure. A problem often encountered is how to physically deter the birds from roosting on the structure while avoiding physical harm to the birds. Such devices address the problem by forming the wire with special shapes (particularly at its distal ends) to avoid sharp points which might impale the birds.

Another known type of anti-roosting device designed especially for a buoy is shown in U.S. Pat. No. 4,143,437. The device comprises a series of wires and a support structure which support the wires in a relatively delicately balanced position. When a bird attempts to land on one of the wires, the weight of the bird unbalances the device and causes it to tilt, thereby frightening the bird away. Still another device for preventing roosting of birds on marine craft comprises wind rotated members attached to selected parts of the craft to visibly scare birds away from the protected parts of the craft.

In U.S. Pat. No. 5,181,338, a bird deterrent method and device uses a multiplicity of projecting members which radiate out from a flange and base that is secured to the bird perching area. The projecting members are not strong enough to support the weight of a bird and produce an erratic movement to deter the birds from perching thereon.

SUMMARY OF THE INVENTION

A bird deterrent apparatus has a base for attaching to a surface and a post attached thereto and extending therefrom in a generally vertical direction when attached to a top of a pole. A plurality of moveable fingers are attached to the post and each of the attached fingers extend at a downward angle and away from the post so that a bird landing on one of the plurality of movable fingers will cause the movable fingers to move and prevent the bird from perching thereon. A plurality of fingers are spaced around the post and may be flexible metal members, or alternatively, may be a plurality of rigid rods each forming a pair of fingers by the rod extending through a bore in the post and being bent downward on each side of the post so that a pair of fingers are attached and swing in seesaw fashion so that a bird landing on the one finger of a pair will move it downward while moving the opposite attached finger upward.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
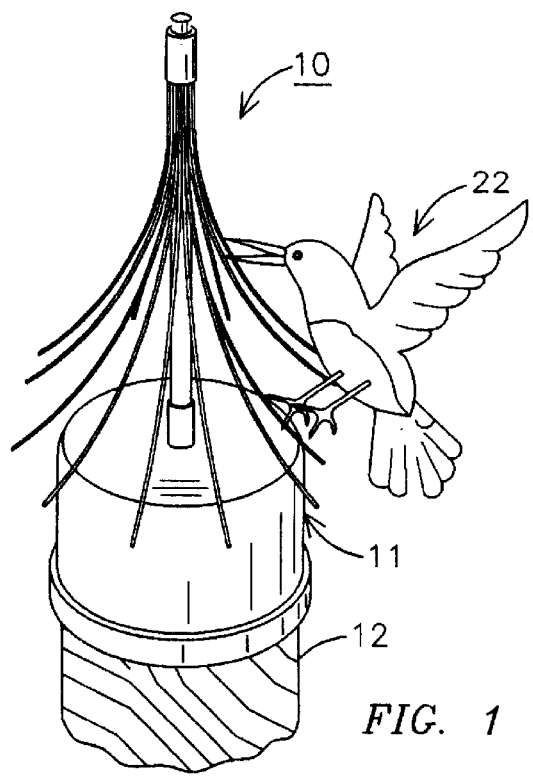
FIG. 1 is a perspective view of a bird deterrent apparatus in accordance with the present invention attached to the top of a post.
Figure 3:
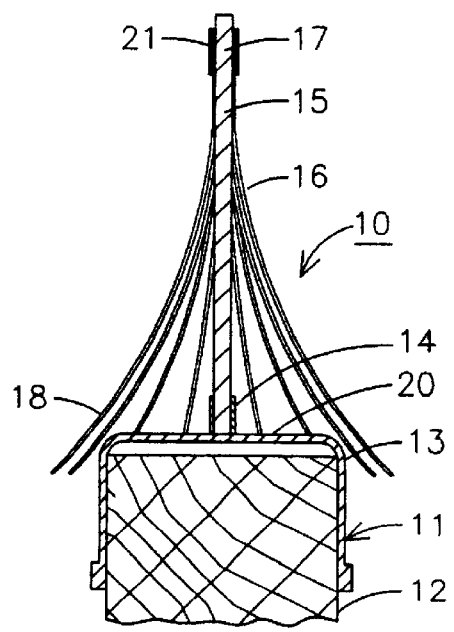
FIG. 3 is a sectional view taken through the bird deterrent apparatus of FIGS. 1 and 2.
Figure 2:
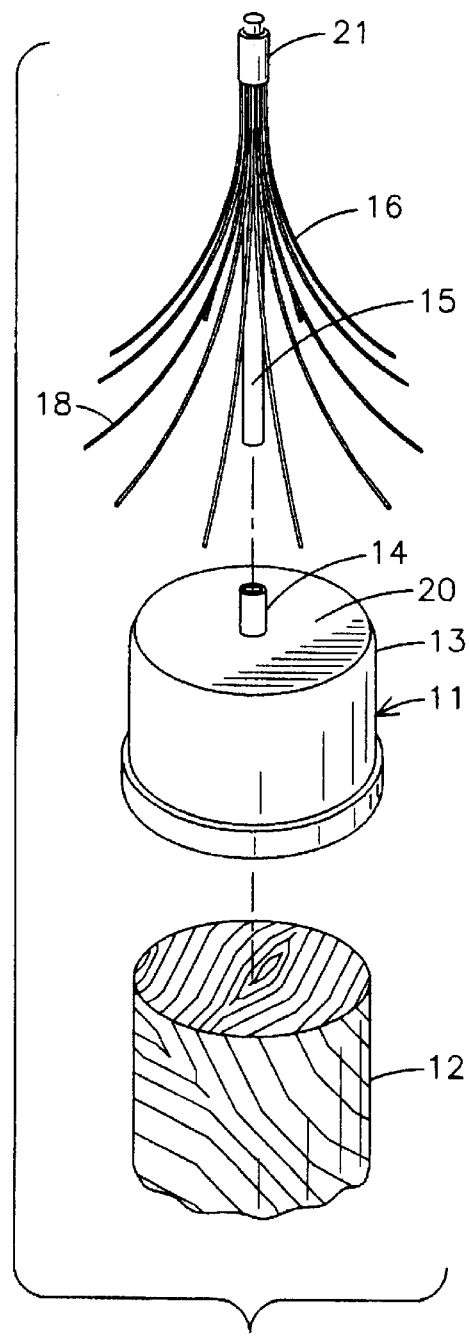
FIG. 2 is an exploded perspective view of the bird deterrent apparatus of FIG. 1.

Referring to the drawings of FIGS. 1–3, a bird deterrent apparatus 10 has a base 11 which is shown attached to the top of a pole 12. The base 11 is shown having a generally tubular cup shape designed to fit over an effected structural member, an existing utility pole or the top of a sailing boat mast or the like and may be made of metal or fiberglass or any material desired. The tubular shaped body 13 of the base 11 has a post attaching extension 14 shown as a cylindrical extension for inserting and attaching a post 15 thereinto. The post has a plurality of fingers 16 attached to the upper portion 17 thereof and extending downwardly at an angle and being curved outwardly so that the tips 18 of the fingers 16 extend beyond the top 20 of the base 11. The fingers 16 are shown clamped with a sleeve clamp to the post 15 with a clamp 21 but could of course be attached in any manner desired including attaching with adhesives.

In FIG. 1, a bird 22 is illustrated attempting to land on one of the fingers 16. The finger is made of a flexible spring-like material, such as a steel spring wire, which readily collapses when the bird 22 attempts to land on the finger 16 and returns to a neutral position when the bird leaves. The bird, being unable to find a perch on the wire, is deterred from landing on the wire or the top of the pole 12.

Figure 4:
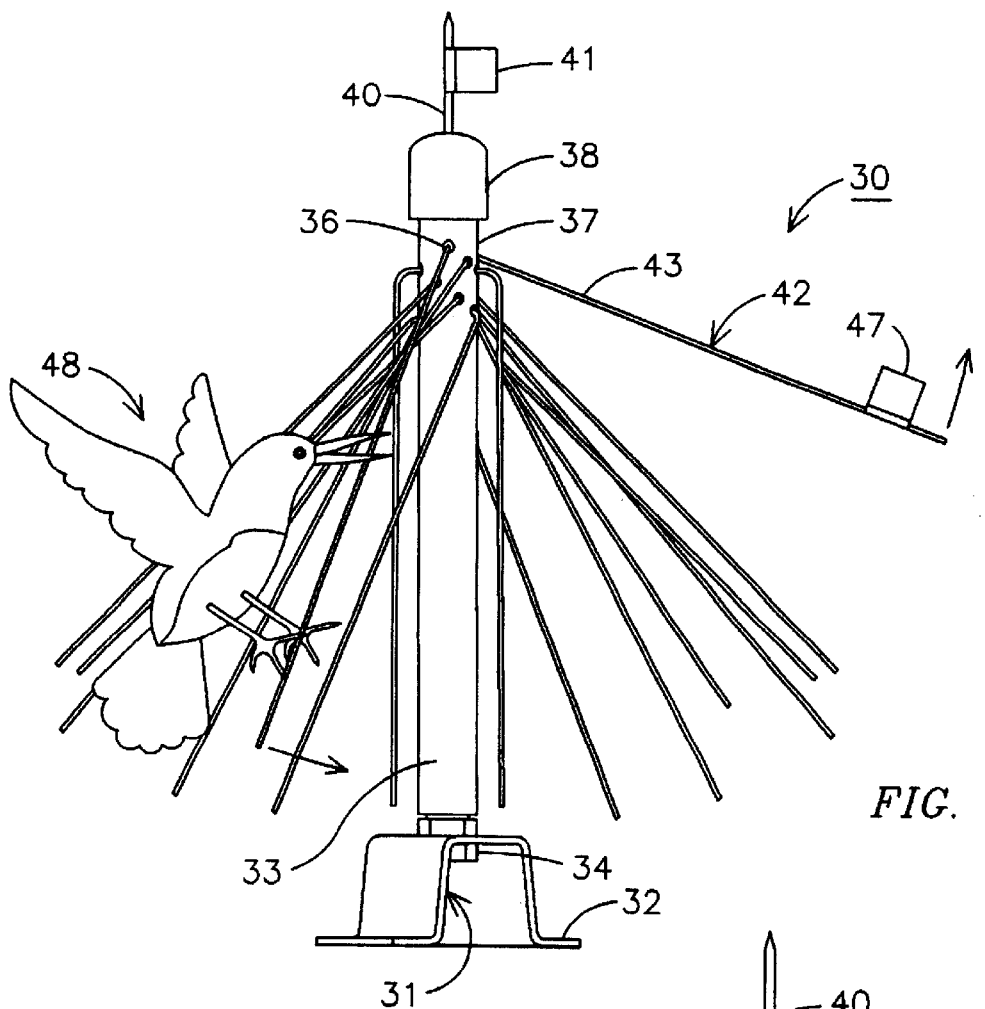
FIG. 4 is a perspective view of the second embodiment of a bird deterrent apparatus.
Figure 5:
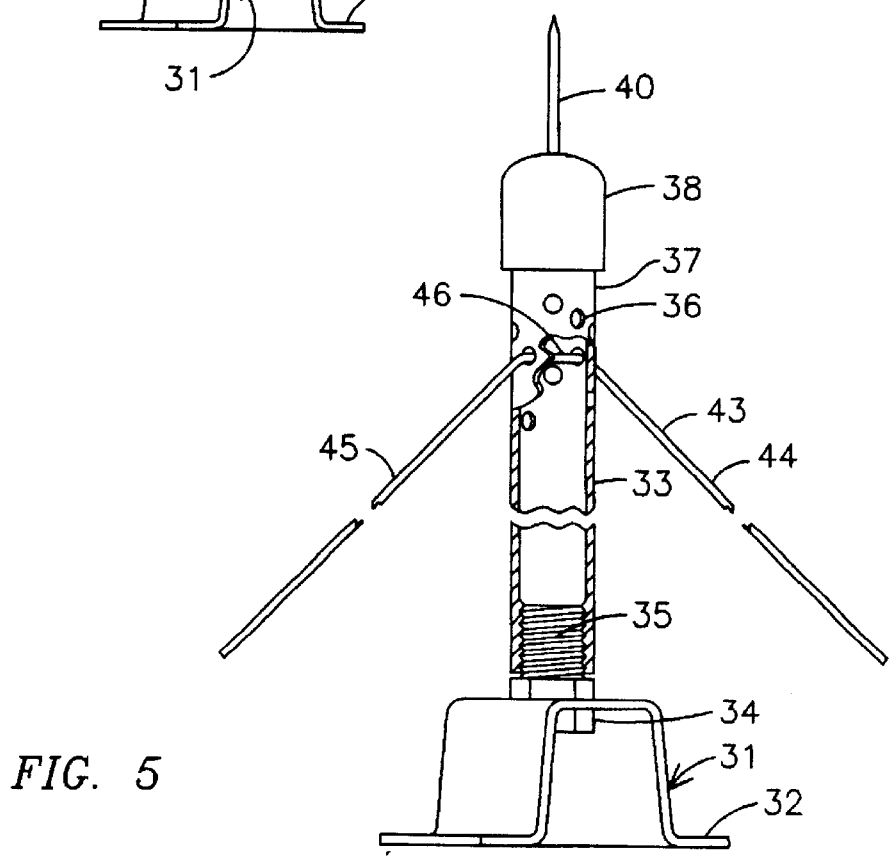
FIG. 5 is a cutaway perspective view of a portion of the bird deterrent apparatus of FIG. 4.
Figure 6:
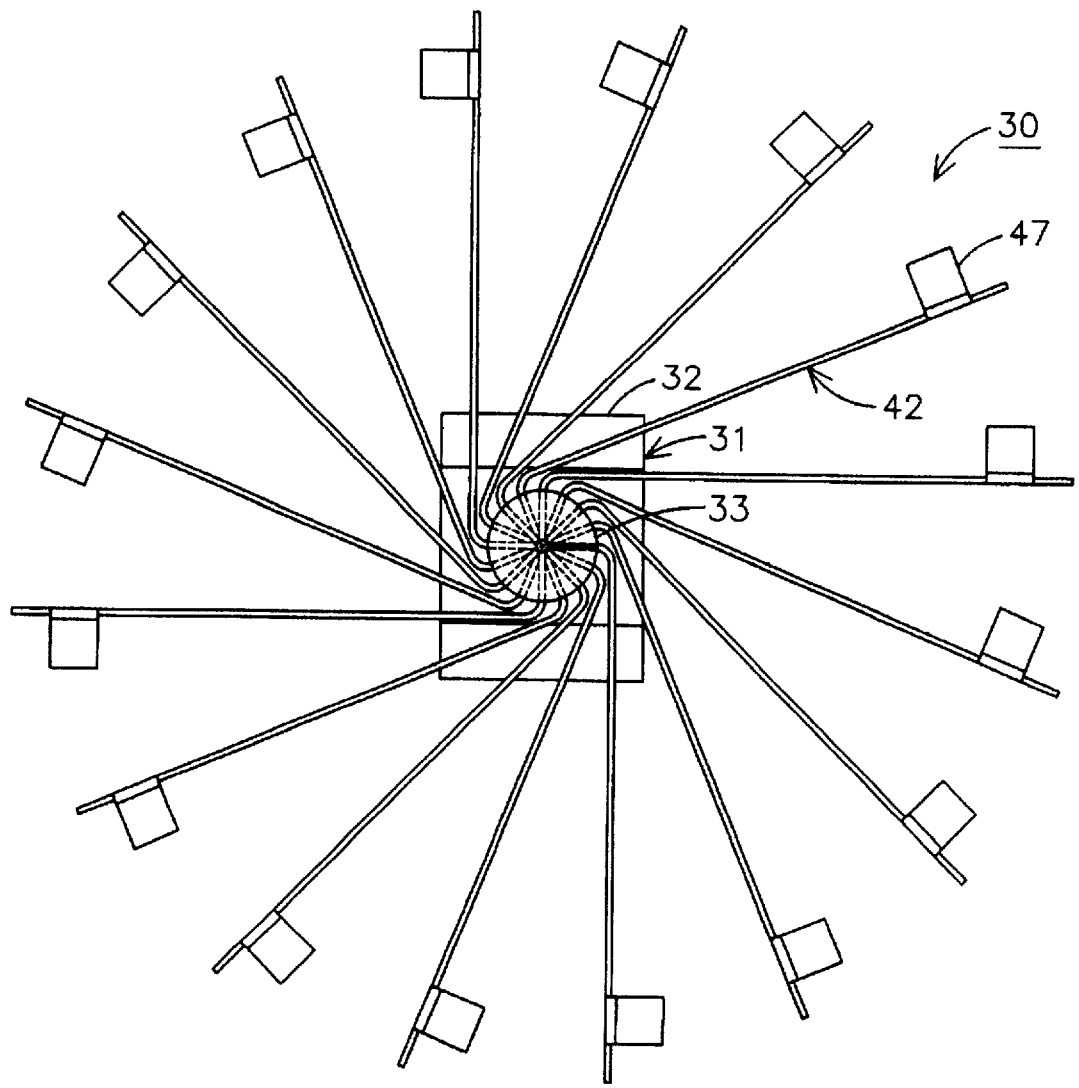
FIG. 6 is a top plan view of the bird deterrent apparatus of FIGS. 4 and 5.

Turning to FIGS. 4–6, a preferred embodiment of a bird deterrent apparatus 30 is illustrated having a base 31 having a pair of extending flanges 32 for attaching to the top of a pole or to any other structure where it is desired to prevent birds from roosting thereon. The base 31 has a vertically extending post 33 which can be attached with a nut 34 onto a threaded attachment member 35 or any other coupling desired. The post 33 can be seen as being hollow and having a plurality of bores 36 extending therethrough in the upper portion 37 thereof. The post 33 has a cap 38 having a vertical spike 40 attached to the top thereof which may have a flag 41 attached thereto. A plurality of fingers 42 are formed in pairs, each pair formed from a single metal rod 43 which has been inserted through a bore 36 in the post 33 and bent at an angle. The holes are drilled such that each wire defines its own vertical travel using 16 wires at 22.5 degrees each.

As shown in FIG. 5, the rod 43 is bent on each side of the post 33 in a downward position and at an angle so that one finger 44 of a rod and the second finger 45 of the same rod 43 are positioned at an angle to each other so that moving the finger 44 rotates the finger on the rod portion 46 in the bore 36. Thus, rotating the finger 44 downward rotates the finger 45 upwards in a seesaw fashion on a hinge portion 46. Fingers 42 can be made of a stiff metal rod, such as a steel rod, while the posts 33 can be made of a polymer material, such as a self-lubricating polymer or metal, which allows the free rotation of the fingers 42. Each finger may also have a flag 47 mounted thereon.

In this manner, a bird 48 attempting to land on one of the fingers 42, as shown in FIG. 4, will drive the finger 42 downward which will in turn rotate the connected finger on the other side of the post 33 upwards, swinging the flag 47 upward and thus prevent the bird 48 from finding a stable perch and deter the bird from landing. Once the bird 48 leaves, the pair of connected fingers will rotate back in place from the gravitational force of the weight of the fingers. Thus, as seen in FIG. 5, the finger 44 when pushed down will, by its own weight, attempt to rotate back to find a balance with the weight of the finger 45 in a see-saw type movement. The fingers 42 can be deliberately weighted, such as with the flags 47, or weighted by the weight of the rod when made of a metal having sufficient mass to counterbalance each of the two attached fingers. The fingers may be made of a generally rigid steel.

It should be clear at this time that a bird deterrent apparatus has been provided which will attempt to discombobulate the bird attempting to land on one of the unable moveable fingers. However, it should also be clear that the present invention is not limited to the forms shown which are to be considered illustrative rather than restrictive.

I claim:

1. A bird deterrent apparatus comprising:
   a base having means for attaching to the top surface of a pole;
   a post having two end portions and having one said end portion attached to and extending generally vertically from said base;
   a plurality of flexible wire fingers clamped to said post other end portion, each of said plurality of fingers extending downward from said post and being curved away from said post to extend over said base;
   whereby a bird landing on one of said plurality of movable fingers will cause the movable finger to move and prevent the bird from perching thereon.

2. A bird deterrent apparatus in accordance with claim 1 in which said plurality of fingers are spaced around said post.

3. A bird deterrent apparatus in accordance with claim 2 in which each finger is a flexible metal wire.

4. A bird deterrent apparatus in accordance with claim 3 in which said base is shaped to fit the top of a cylindrical pole.

5. A bird deterrent apparatus in accordance with claim 4 in which said base is cylindrical shaped fiberglass to fit over the top of a cylindrical pole.

6. A bird deterrent apparatus comprising:
   a base having means for attaching to a surface;
   a post having two end portions and having one end portion attached thereto and extending generally vertically from said base, said post having a plurality of bores extending through the other end portion thereof;
   a plurality of elongated rods, each rod having two end portions and being movably mounted through one said post bore and each said end portion of each said rod being bent at an angle to the other said end portion of the same rod on the opposite side of said post to form an extending finger on each side of said post with each end portion of each said rod wherein moving one said rod finger will move the other finger of said same rod;
   whereby a bird landing on one of said plurality of movable fingers will cause the movable finger to move thereby moving the connected finger preventing the bird from perching thereon.

7. A bird deterrent apparatus in accordance with claim 6 in which each said finger of each said rod has a flag thereon.

8. A bird deterrent apparatus in accordance with claim 7 in which each said finger is biased to return to a neutral position when moved.

9. A bird deterrent apparatus in accordance with claim 8 in which each said finger is biased by the weight of the pair of connected fingers of each rod.

10. A bird deterrent apparatus in accordance with claim 9 in which each elongated rod is metal.

\* \* \* \* \*